__(12)__ United States Patent
Kao

(10) Patent No.: US 6,914,995 B2
(45) Date of Patent: Jul. 5, 2005

(54) PORTABLE MULTI-FUNCTION DEVICE

(76) Inventor: Chia-Hung Kao, 5f., No. 22, Aly. 3, Lan 289, Chuang-Ching Rd., Taipei (TW), 110

( * ) Notice: Subject to any disclaimer, the term of this patent is extended or adjusted under 35 U.S.C. 154(b) by 146 days.

(21) Appl. No.: 10/318,136

(22) Filed: Dec. 13, 2002

(65) Prior Publication Data

US 2004/0057594 A1 Mar. 25, 2004

(51) Int. Cl.[7] .............................................. H04R 25/00
(52) U.S. Cl. ........................ 381/370; 381/374; 381/385; 381/394; 381/395; 455/575.1; 455/575.8; 379/438.02; 379/434; 379/433.11
(58) Field of Search ................................. 381/370, 384, 381/374–376, 371, 379, 380, 383–385, 394, 395, 182; 242/400.1, 405.2, 407, 385.4; 379/400, 431, 433.03, 433.02, 433.01, 434, 377, 29.03–29.04, 207.07, 30, 393, 381; 224/196, 191, 667, 929, 930; 248/316.1, 316.7

(56) References Cited

U.S. PATENT DOCUMENTS

| | | | | | |
|---|---|---|---|---|---|
| 4,450,495 A | * | 5/1984 | Naruki | ...................... | 360/137 |
| 4,921,103 A | * | 5/1990 | Cohen | ...................... | 206/523 |
| 5,339,461 A | * | 8/1994 | Luplow | ...................... | 455/351 |
| 5,395,023 A | * | 3/1995 | Naymark et al. | ........... | 224/682 |
| 5,706,353 A | * | 1/1998 | Arai et al. | ..................... | 381/77 |
| 5,771,305 A | * | 6/1998 | Davis | ......................... | 381/386 |
| 5,819,893 A | * | 10/1998 | Wagner et al. | ............. | 191/12.4 |
| 5,832,098 A | * | 11/1998 | Chen | ........................... | 381/370 |
| 5,898,787 A | * | 4/1999 | Stanford | ..................... | 381/332 |
| 6,318,610 B1 | * | 11/2001 | Doherty | ..................... | 224/271 |
| 6,434,249 B1 | * | 8/2002 | Wei | ............................ | 381/370 |
| 6,542,757 B2 | * | 4/2003 | Bae | .......................... | 455/575.2 |
| 6,567,651 B2 | * | 5/2003 | Whitley | ...................... | 224/929 |
| 6,633,770 B1 | * | 10/2003 | Gitzinger et al. | ........ | 455/575.1 |
| 6,637,484 B1 | * | 10/2003 | Kraft | .......................... | 150/112 |
| 2002/0133659 A1 | | 9/2002 | Tree et al. | | |

* cited by examiner

*Primary Examiner*—Curtis Kuntz
*Assistant Examiner*—Dionne Harvey
(74) *Attorney, Agent, or Firm*—Troxell Law Office, PLLC

(57) ABSTRACT

A portable multi-function device includes a housing and a cover. The housing includes an interior housing and an exterior housing connecting to each other. The interior housing has at least a hub having audio units. Recess parts are located on the upper side of the interior housing for placing the audio units. The exterior housing has a storage box. Terminal ends on side of the storage box connect correspondingly to each of the audio units for placing a data process device in the storage box. The cover is mounted on a side of the housing. A connector is installed at another side of the housing corresponding to the cover to lock and unlock the housing. The cover has holes corresponding to each of the recess parts on the upper side of the interior housing. Whereby, each of the audio units is portable and easy for storage.

6 Claims, 6 Drawing Sheets

PORTABLE MULTI-FUNCTION DEVICE

FIELD OF THE INVENTION

The present invention relates to a portable multi-function device particularly including a housing for placing a data process device, a microphone and a headset therein. Terminal ends on a side of a storage box of the exterior housing connect correspondingly to audio units. Therefore, the data process device placed in the storage box is able to connect to the terminal ends. Furthermore, the design of the cover having a connector connecting to the housing makes it a firmly combined structure with effects of portable convenience and easy storage. The present invention is suitable for audio devices or similar devices.

BACKGROUND OF THE INVENTION

Since the use of data process devices provided with multi functions, such as MP3 playing, recording, data saving, broadcasting, and card reading, becomes very popular, users and manufacturers typically pay much attention to storage problems of the data process device. Additionally, various ways of storing data process devices are developed.

Referring to FIG. 1, most of data process devices in the prior art directly put audio units, such as a microphone 42 and a headset 41, in a plug jack on a side of the data process device 4 when using. Even though the data process device 4, the microphone 42, and the headset 41 in the prior art are combined together when using, users still need to seek some other ways to store the audio units when not using. For this reason, the whole device of the prior art is inconvenient to use and to store.

SUMMARY OF THE INVENTION

The objective of the present invention is to provide a portable multi-function device, including a housing for placing a data process device, a microphone, and a headset therein, for portable convenience and enhancement of practicability and facility.

Another objective of the present invention is to provide a portable multi-function device, having recess parts on an upper side of the interior housing for placing audio units and a cover with holes corresponding to the recess parts on the upper side of the interior housing. The cover has a connector connecting to another side of the housing for not only lock and unlock of the housing but also making the microphone and the headset easy to use and to store.

Still another objective of the present invention is to provide a portable multi-function device, in which terminal ends on a side of a storage box of the exterior housing connect correspondingly to audio units. Therefore, the data process device placed in the storage box is able to connect to the terminal ends for portable convenience.

To achieve the objectives mentioned above, the present invention provides a housing and a cover combined together. The housing includes an interior housing and an exterior housing connecting to each other. Recess parts are correspondingly located on the upper side of the interior housing for placing audio units. The exterior housing has a storage box. Terminal ends on a side of the storage box of the exterior housing connect correspondingly to audio units. The data process device placed in the storage box correspondingly connects to the terminal ends. The cover is mounted on a side of the housing. A connector is installed at another side of the housing corresponding to the cover to lock and unlock the housing. Furthermore, the cover has recess holes in the recess parts of the upper side of the housing. Therefore, each of the audio units is convenient for users to store and to carry.

To fully understand advantages and structure of the present invention, a detailed disclosure according to a preferred embodiment of the present invention will be described as follows.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE INVENTION

According to the disadvantages of conventional data process device as described above, the present invention provides an improvement solution for that. Embodiments of this invention will be described in detail with reference to attached drawings.

Figure 1:
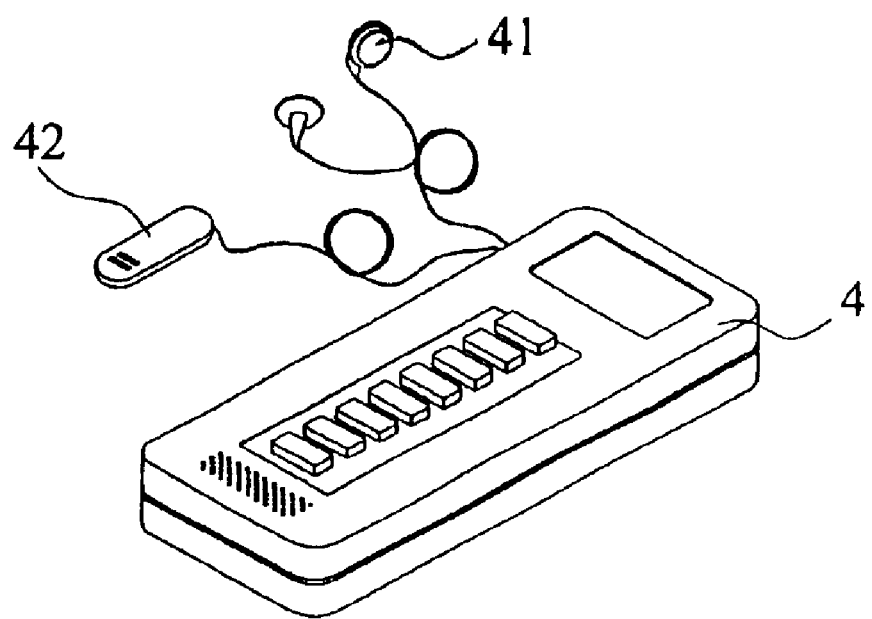
FIG. 1 shows a diagram of the prior art.
Figure 2:
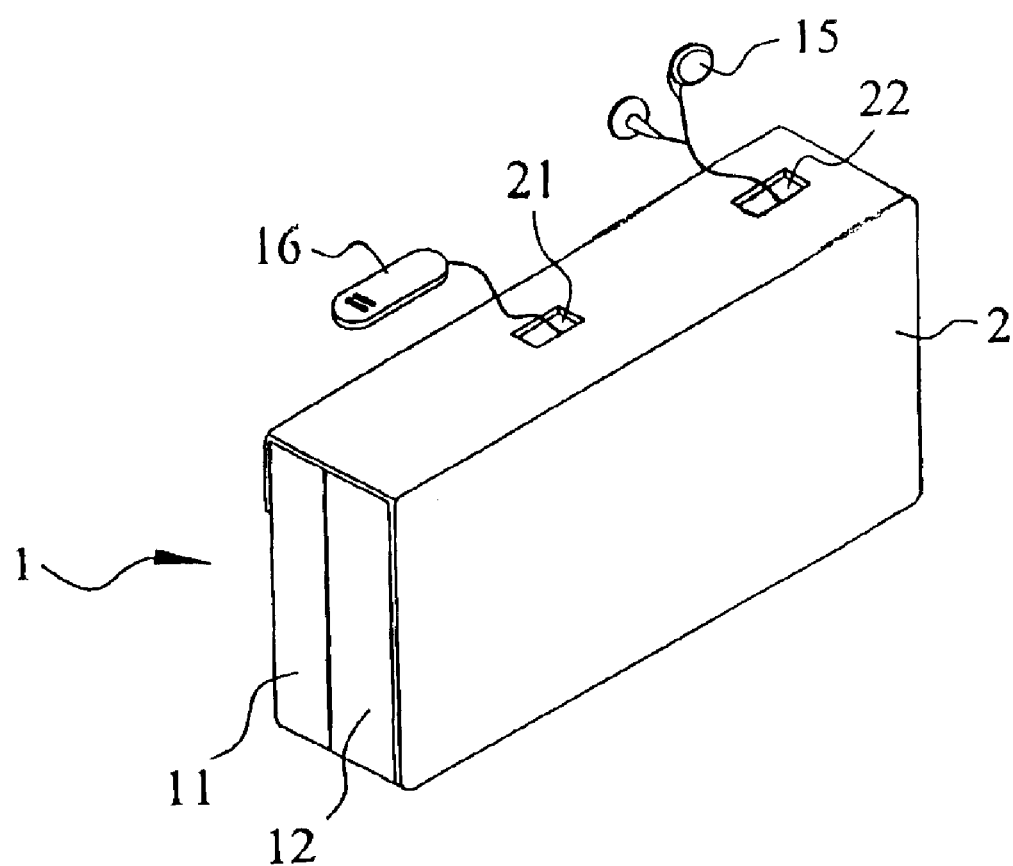
FIG. 2 shows a diagram of the present invention in accordance with an embodiment.
Figure 3:
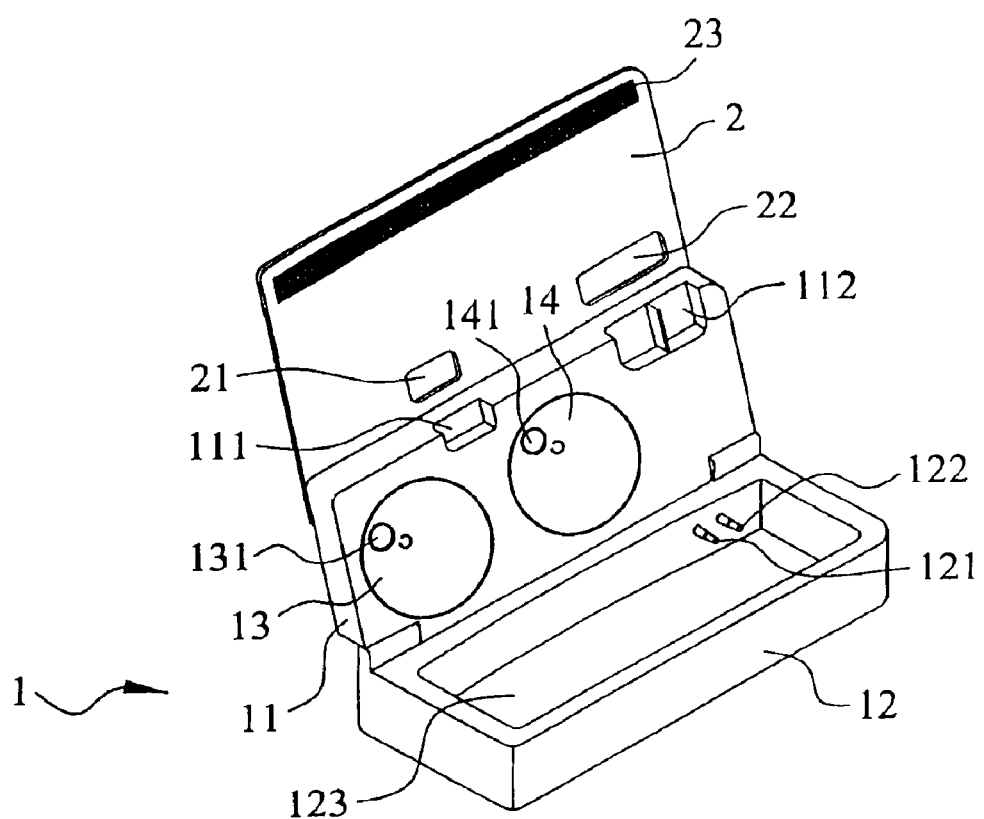
FIG. 3 shows a diagram of a housing and a cover in accordance with an embodiment of the present invention.
Figure 4:
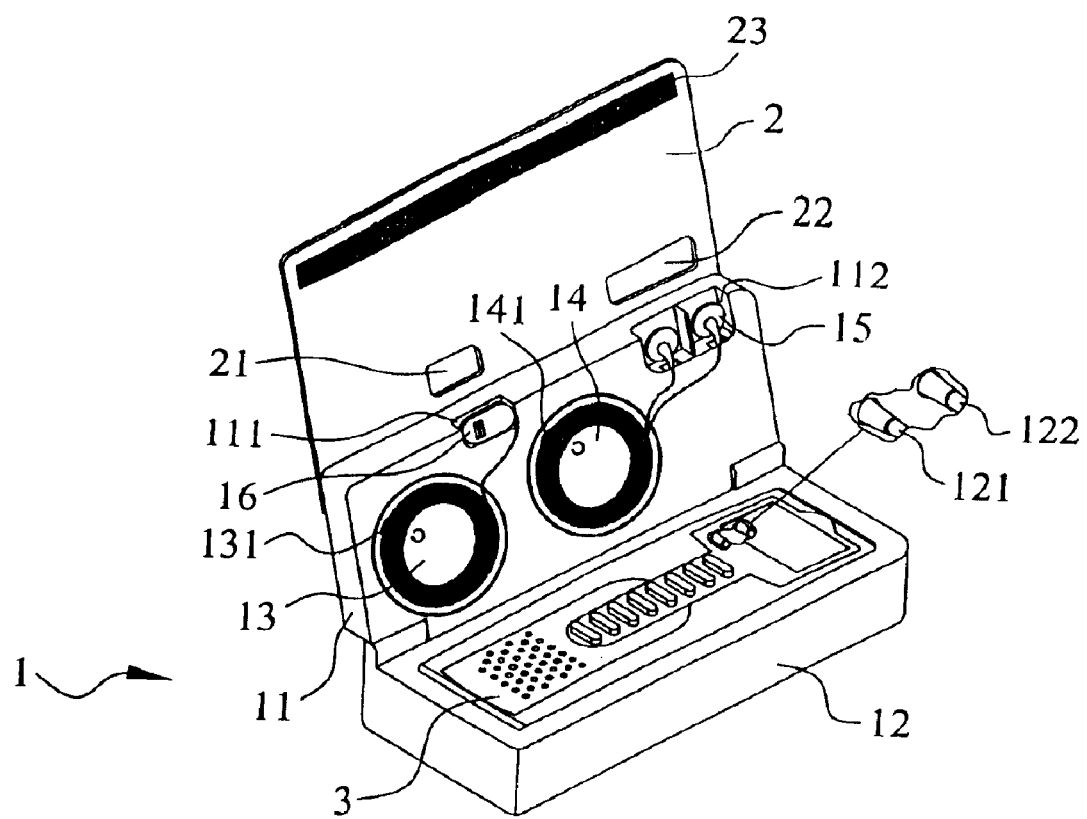
FIG. 4 shows a diagram of the present invention in a combination configuration in accordance with an embodiment.
Figure 5:
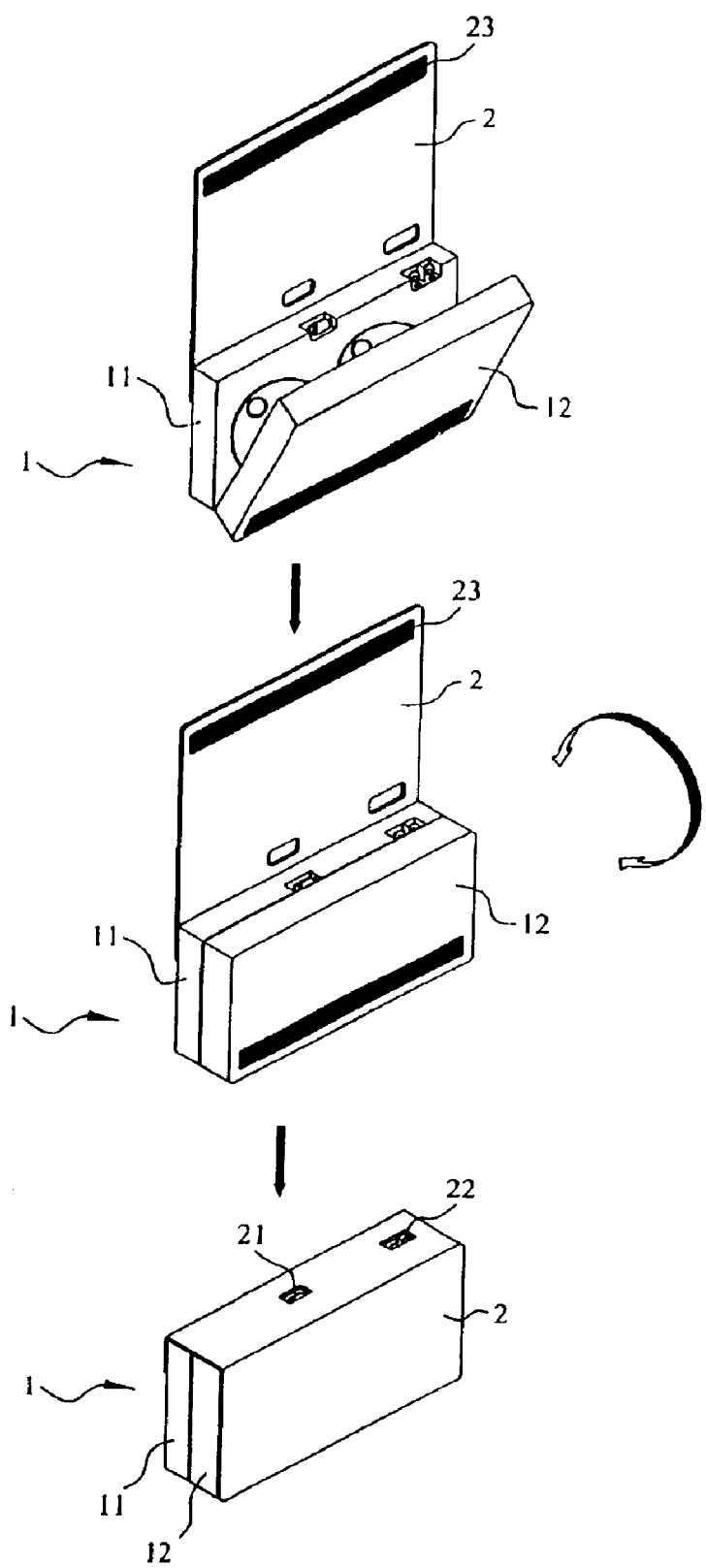
FIG. 5 shows a diagram of the present invention in a storage configuration in accordance with an embodiment.

As shown in FIG. 2 to FIG. 4, the present invention provides a portable multi-function device including a housing 1 and a cover 2. The cover 2 is mounted on a side of the housing 1. A connector 23, such as a hook and loop fastener or a button, is installed at another side of the housing 1 corresponding to the cover 2 to lock and unlock the housing 1.

The housing 1 includes an interior housing 11 and an exterior housing 12 connecting to each other. The interior housing 11 has hubs 13 and 14 respectively having recess holes 131 and 141 for reeling in wires. Each of the hub 13 and 14 has an audio unit, such as a microphone 16 and u headset 15. Recess parts 111 and 112 are located on the upper side of the interior housing 11 for placing the microphone 16 and the headset 15. The exterior housing 12 has a storage box 123. Terminal ends 121 and 122 on a side of the storage box 123 connect correspondingly to the microphone 16 and the headset 15. A data process device 3 placed in the storage box 123 may connect to the terminal ends 121 and 122.

The cover 2 has a hole 21 corresponding to the recess part 111 on the upper side of the interior housing 11 and a hole 22 corresponding to the recess part 112 on the upper side of the interior housing 11 for easy storage and portable convenience.

By means of the devices mentioned above, a portable multi-function device is obtained. As shown in FIG. 3 to FIG. 6, the feature of the present invention is that the interior housing 11 of the housing 1 has hubs 13 and 14 for respectively placing the microphone 16 and the headset 15. Also, recess parts 111 and 112 are located on the upper side of the interior 111 for placing the microphone 16 and the headset 15 respectively. Terminal ends 121 and 122 on the side of the storage box 123 of the exterior housing 12 connect correspondingly to the microphone 16 and the headset 15. The data process device 3 placed in the storage box 123 is able to connect to the terminal ends 121 and 122. Thus, the data process device 3, tho microphone 16, and the headset 15 are combined and connected to each other for portable convenience. Furthermore, the cover 2 has the hole 21 corresponding to the recess part 111 on the upper side of the interior housing 11 and the hole 22 corresponding to the recess part 112 on the upper side of the interior housing 11. The cover 2 has a connector 23 connecting to another side of the housing I for not only lock and unlock of the housing 1 but also making the microphone 16 and the headset 15 easy to use and to store. Therefore, the present invention results in a firmly combined structure with effects of portable convenience and easy storage that enhance practicability and facility to the whole device.

Figure 6:
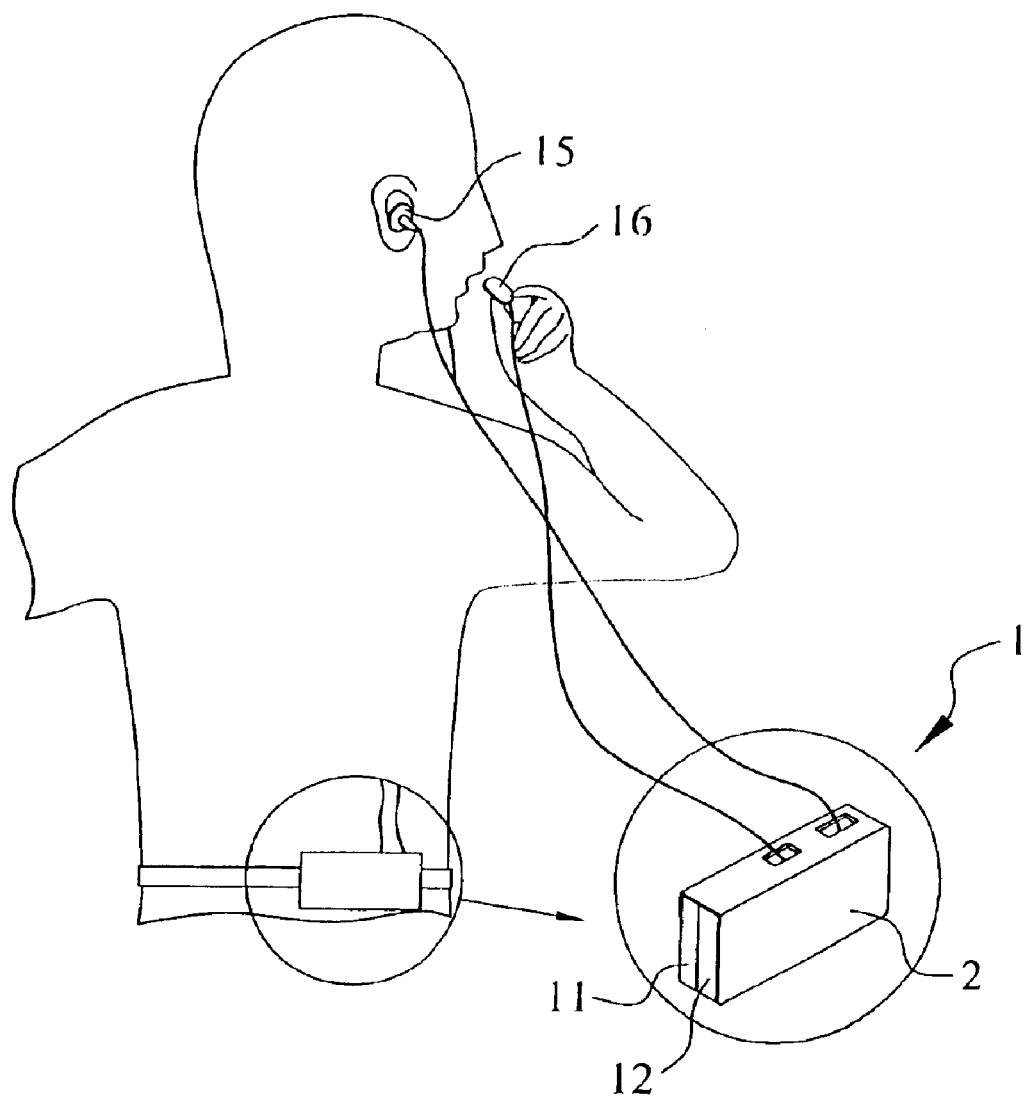
FIG. 6 shows a diagram of the present invention in a use configuration in accordance with an embodiment.

As shown in the FIG. 6, when using, the cover 2 could further have a belt loop (not shown, which could be replaced by a clip member for clipping a belt) on a back side for passing through a belt for portable convenience. The microphone 16 and the headset 15 could be pulled out directly when using and be reeled in the housing 1 when not using. Moreover, said data process device 3 further comprises mobile phone. As a result, it is quite convenient for use and portability.

In conclusion, the present invention has the following advantages:

1. In the housing, the present invention is capable of integrating a data process device, a microphone, and a headset together for portable convenience and enhancement of practicability and facility.

2. The present invention has the recess parts on the upper side of the interior housing for placing audio units and the cover having holes corresponding to the recess parts on the upper side of the interior housing. The cover has a connector connecting to another side of the housing for not only lock and unlock of the housing but also making the microphone and the headset easy to use and to store.

3. In the present invention, since terminal ends on the side of the storage box of the exterior housing connect correspondingly to the audio units, the data process device placed in the storage box is able to connect to the terminal ends for portable convenience.

The present invention has been described above with reference to a preferred embodiment. However, the present invention is not limited to the above embodiment. Other embodiments not shown herein equally possible within the scope of the invention are in the scope of the present invention. Various changes, modifications and enhancements could be made therein without departing from the scope of the present invention as set forth in the following claims. The present invention results in a firmly combined structure with effects of portable convenience and easy storage that enhance practicability and facility. Therefore, the present invention has filled the requirement for practical utility in patent application.

What is claimed is:

1. A portable multi-function device comprising:
    a) a housing assembly having:
        i) an exterior housing having a storage box with terminal ends; and
        ii) an interior housing pivotally connected at a first side thereof to the exterior housing and having recess parts and at least one hub having audio units located in the recess parts, the recess parts are located on a second side of the interior housing, and each of the audio units is connected to the terminal ends;
    b) a connector;
    c) a cover connected to a second side of the interior housing and movable between open and closed positions, such that, in the closed position, the cover overlaps the exterior housing and is connected thereto by the connector, and, in the open position, the cover is separated from the exterior housing, the cover having a plurality of holes, each of the plurality of holes aligning with one of the recess parts when the cover is in the closed position; and
    d) a data processing device located in the storage box and connected to the terminal ends, the data processing device located on an interior of the housing assembly when the cover is in the closed position.

2. The portable multi-function device of claim 1, wherein said connector is a hook and loop fastener.

3. The portable multi-function device of claim 1, wherein said connector is a button.

4. The portable multi-function device of claim 1, wherein said audio units include a headset.

5. The portable multi-function device of claim 1, wherein said audio units include a microphone.

6. The portable multi-function device of claim 1, wherein said data processing device is a mobile phone.

* * * * *